(12) United States Patent
Imamura

(10) Patent No.: US 8,979,403 B2
(45) Date of Patent: Mar. 17, 2015

(54) CAMERA BODY, INTERCHANGEABLE-LENS CAMERA, AND METHOD OF DETERMINING MOUNTING OF LENS

(71) Applicant: FUJIFILM Corporation, Tokyo (JP)

(72) Inventor: Kenshi Imamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/335,184

(22) Filed: Jul. 18, 2014

(65) Prior Publication Data

US 2014/0327814 A1  Nov. 6, 2014

Related U.S. Application Data

(63) Continuation of application No. PCT/JP2013/050528, filed on Jan. 15, 2013.

(30) Foreign Application Priority Data

Jan. 19, 2012 (JP) ................ 2012-009089

(51) Int. Cl.
| | |
|---|---|
| G03B 17/00 | (2006.01) |
| G03B 17/14 | (2006.01) |
| H04N 5/225 | (2006.01) |
| H04N 5/232 | (2006.01) |
| G03B 17/18 | (2006.01) |

(52) U.S. Cl.
CPC .............. *G03B 17/14* (2013.01); *H04N 5/2254* (2013.01); *H04N 5/23209* (2013.01); *G03B 17/18* (2013.01)
USPC .......................................... 396/529

(58) Field of Classification Search
USPC .................... 396/529, 532; 348/360
See application file for complete search history.

(56) References Cited

U.S. PATENT DOCUMENTS

| | | | | |
|---|---|---|---|---|
| 6,097,511 | A  * | 8/2000 | Hirasawa et al. ............. | 348/335 |
| 6,839,511 | B2 * | 1/2005 | Nishida et al. ................. | 396/87 |
| 8,237,852 | B2 * | 8/2012 | Shibuno et al. ............... | 348/360 |
| 8,515,271 | B2 * | 8/2013 | Tanaka ............................ | 396/49 |

(Continued)

FOREIGN PATENT DOCUMENTS

| | | |
|---|---|---|
| JP | 7-114087 A | 5/1995 |
| JP | 2005-38281 A | 2/2005 |

(Continued)

OTHER PUBLICATIONS

International Search Report, issued in PCT/JP2013/050528, dated Apr. 23, 2013.

(Continued)

*Primary Examiner* — Christ Mahoney
(74) *Attorney, Agent, or Firm* — Birch, Stewart, Kolasch & Birch, LLP

(57) ABSTRACT

A main CPU (a mounting determination part) in a camera body makes a determination by detecting voltage, at a lens detection terminal, n1 consecutive times at time intervals of d1, at the time of turning on a power supply with a power switch. After a result of the determination turns out to be non-mounting, the main CPU makes a determination by detecting voltage, at the lens detection terminal, n2 consecutive times at time intervals of d2 (where n2 and d2 are equal to or greater than to n1 and d1, respectively) on condition that any one of conditional expressions d1<d2 and n1<n2 is met.

6 Claims, 6 Drawing Sheets

(56) References Cited

U.S. PATENT DOCUMENTS

| | | | |
|---|---|---|---|
| 8,564,686 B2 * | 10/2013 | Kurahashi et al. | 348/222.1 |
| 2004/0202464 A1 * | 10/2004 | Miyasaka et al. | 396/529 |
| 2007/0189730 A1 | 8/2007 | Okamura | |
| 2011/0164154 A1 | 7/2011 | Honjo et al. | |
| 2011/0200313 A1 * | 8/2011 | Tamura | 396/91 |
| 2012/0287305 A1 * | 11/2012 | Ozaki | 348/231.99 |

FOREIGN PATENT DOCUMENTS

| | | |
|---|---|---|
| JP | 2007-243934 A | 9/2007 |
| WO | WO 2010/029698 A1 | 3/2010 |

OTHER PUBLICATIONS

Written Opinion of the International Searching Authority, issued in PCT/JP2013/050528, dated Apr. 23, 2013.

* cited by examiner

CAMERA BODY, INTERCHANGEABLE-LENS CAMERA, AND METHOD OF DETERMINING MOUNTING OF LENS

CROSS-REFERENCE TO RELATED APPLICATIONS

This application is a Continuation of PCT International Application No. PCT/JP2013/050528 filed on Jan. 15, 2013, which claims priority under 35 U.S.C. §119(a) to Japanese Patent Application No. 2012-009089 filed on Jan. 19, 2012. Each of the above applications is hereby expressly incorporated by reference, in their entirety, into the present application.

BACKGROUND OF THE INVENTION

1. Field of the Invention

The present invention relates to an interchangeable-lens camera having a camera body to which a lens unit is removably attached, a camera body and a method of determining the mounting of a lens.

2. Description of the Related Art

Interchangeable-lens cameras in which a lens unit having an imaging lens is removably attached to a camera body have become widely available. Examples of such an interchangeable-lens camera include, in general, single-lens reflex cameras equipped with a reflecting mirror that reflects light incident on the lens unit to guide the light to the optical viewfinder, and mirrorless interchangeable-lens cameras without a reflecting mirror. In addition, there are known interchangeable-lens cameras that are provided with an imaging element in the camera body and others that are provided with an imaging element in the lens unit.

Japanese Patent Application Laid-Open No. 7-114087 (PTL 1) discloses the configuration of a camera having a camera body with a detachable lens unit. The camera includes a lens detection terminal dedicated to the detection of the lens unit. When the lens unit is not mounted, a pull-up resistor causes the lens detection terminal to be at a high level, and when the lens unit is mounted, the lens detection terminal is connected to a ground terminal in the camera body through the lens unit. A CPU of the camera body detects a change in the level of the lens detection terminal from high to low so as to determine if the lens unit is mounted.

SUMMARY OF THE INVENTION

Since the configuration described above performs a common process for determining whether a lens unit is mounted both at the time of turning on the camera body and at the time of mounting the lens unit after turning it on, it disadvantageously takes time to determine mounting/non-mounting even if the lens unit is already mounted at the time of turning on a camera body. Moreover, when trying to shorten the time of determining mounting/non-mounting, there is another disadvantage that the possibility of causing erroneous determination is increased in determining mounting/non-mounting at the time of inserting a hot-line due to chattering, external noise and the like.

The present invention is made in view of the circumstances described above, and it is an object of the present invention to provide an interchangeable-lens camera, a camera body and a method for determining the mounting of a lens, which enables the mounting/non-mounting of a lens unit to be promptly determined at power-on when the lens unit has already been mounted and the reliability of determining mounting/non-mounting to be ensured when a lens unit is mounted after power-on.

An aspect of the present invention provides a camera body which includes: a mounting part to which a lens unit is removably attached, the mounting part having a lens detection terminal to which a pull-up resistor is connected and which is pulled down while the lens unit is mounted; a power supply; a power switch for turning on the power supply; and a mounting determination part determining that the lens unit is mounted on the mounting part if the level of voltage at the lens detection terminal on the mounting part has been detected to be low a plurality of consecutive times. The mounting determination part performs a mounting determination by detecting voltage, at the lens detection terminal, n1 consecutive times at time intervals of d1 at the time of turning-on the power supply with the power switch. After a result of the mounting determination turns out to be non-mounting, the mounting determination part determines mounting by detecting voltage, at the lens detection terminal, n2 consecutive times at time intervals of d2 (where n2 and d2 are equal to or greater than n1 and d1, respectively) on condition that any one of conditional expressions d1<d2 and n1<n2 is met. For example, upon the power supply being turned on with the power switch, the mounting determination part determines that the lens unit is mounted on the mounting part if the level of voltage at the lens detection terminal on the mounting part has been detected to be low at predetermined time intervals and n consecutive times (n: an integer of 2 or greater). If the level of voltage at the lens detection terminal is detected to be high at least once, the mounting determination part makes at least one of the time intervals and the times n larger and determines whether or not the lens unit is mounted on the mounting part. This means that the mounting/non-mounting of a lens unit can be promptly determined at power-on when the lens unit has already been mounted and the reliability of determining mounting/non-mounting can be ensured when a lens unit is mounted after power-on.

In an aspect of the present invention, the mounting determination part detects voltage at the lens detection terminal on condition that the time intervals of voltage detection meet the conditional expression d1<d2 and the consecutive times of voltage detection meet the conditional expression n1<n2.

In an aspect of the present invention, the mounting determination part determines that the lens unit has been removed from the mounting part when the level of voltage at the lens detection terminal has changed from low to high.

A camera body according to an aspect of the present invention further includes: an instruction input device for inputting instructions; and a timer generating a timing for detecting instructions inputted from the instruction input device, wherein the mounting determination part uses the timer to detect voltage at the lens detection terminal at time intervals identical to the time intervals for detecting inputted instructions.

The present invention enables the mounting/non-mounting of a lens unit to be promptly determined at power-on when the lens unit has already been mounted and the reliability of determining mounting/non-mounting to be ensured when a lens unit is mounted after power-on.

DETAILED DESCRIPTION OF EXEMPLARY EMBODIMENTS

An embodiment of the present invention will now be described in detail with reference to the attached drawings.

Figure 1:
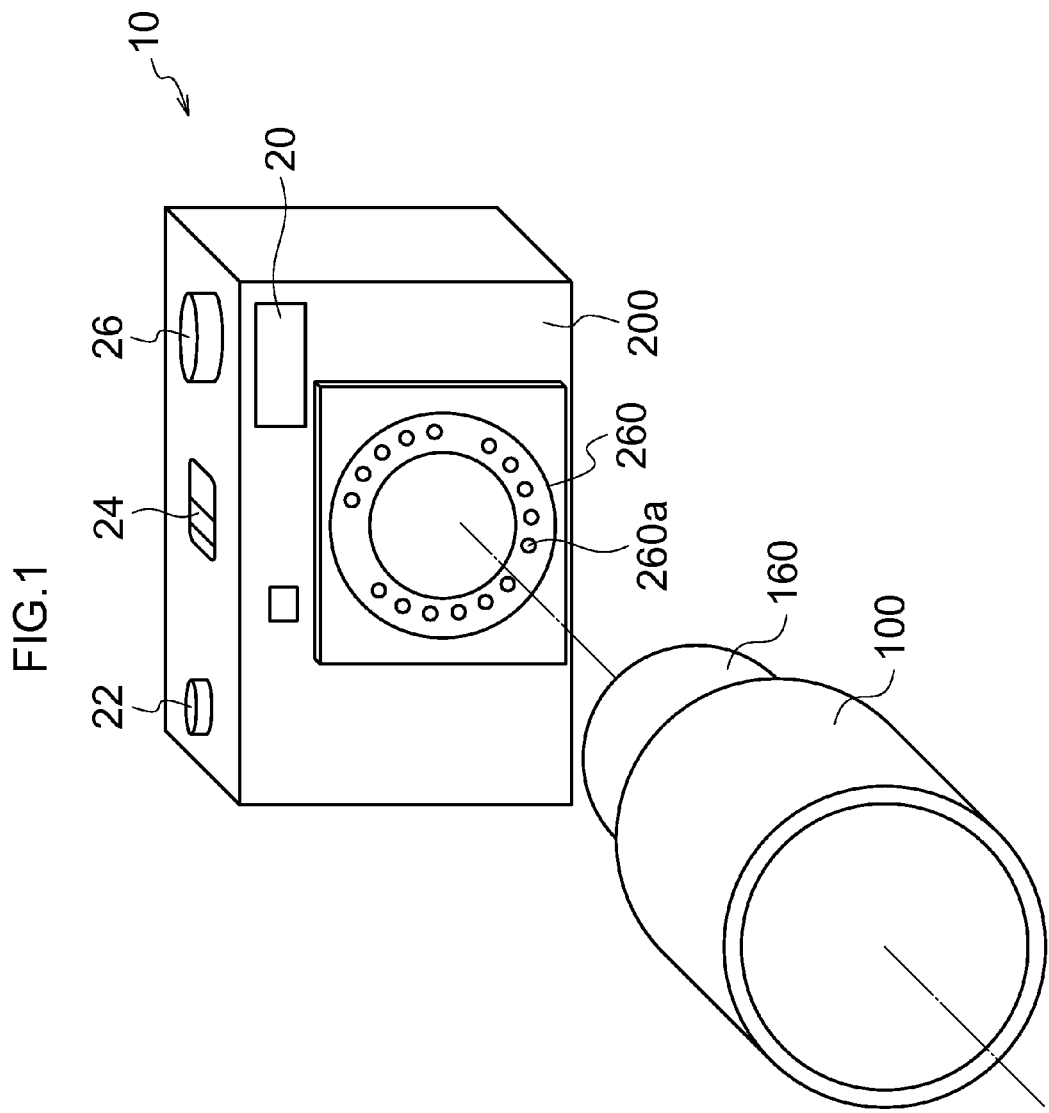
FIG. 1 is an external perspective view of the front of an interchangeable-lens camera in accordance with an embodiment of the present invention.

FIG. 1 is an external perspective view of the front of an interchangeable-lens camera (hereinafter referred to as a "camera") in accordance with an embodiment of the present invention.

As illustrated in FIG. 1, a camera 10 of the embodiment includes a lens unit 100 and a camera body 200. The lens unit 100 includes a lens mount 160 (a mounting part on lens side) removably attached to a body mount 260 (a mounting part on body side, described later) of the camera body 200. The lens unit 100 in this example is cylindrical and the lens mount 160 is formed at an end of the lens unit 100. The camera body 200 includes the body mount 260 to which the lens mount 160 of the lens unit 100 is removably attached. The camera body 200 in this example is shaped in a box form and the body mount 260 is formed at about the center of the front of the camera body 200. Mounting the lens mount 160 of the lens unit 100 on the body mount 260 of the camera body 200 means that the lens unit 100 is removably attached to the camera body 200.

The lens mount 160 and the body mount 260 each include a plurality of terminals provided as contacts. Although FIG. 1 illustrates only terminals 260a on the body mount 260, terminals are also provided on the lens mount 160. Mounting the lens mount 160 on the body mount 260 brings terminals both on the lens mount 160 and the body mount 260 into contact and into conduction. In this example, a plurality of the terminals 260a and a plurality of terminals are provided on the body mount 260 and the lens mount 160, respectively, along the circumferential direction of the lens unit 100.

A flash 20 (built-in flash) that irradiates a subject with illumination light is provided on the front of the camera body 200. A release button 22, a power switch 24 and a dial 26 are provided on the top surface of the camera body 200. Also, a monitor described later (216 of FIG. 2) and various buttons are provided on the back (not illustrated) of the camera body 200.

The release button 22 functions as means for inputting an imaging instruction. The release button 22 is designed to be used in two stages, what is called "press halfway down" and "press all the way down". The camera 10 performs Automatic Exposure (AE) and Auto Focus (AF) functions with the release button 22 pressed halfway down and imaging with the release button 22 pressed all the way down.

The power switch 24 is a slide-type switch in this example. Sliding the power switch 24 turns on/off the camera body 200. The power switch 24 is not limited to a slide type, and no limitations are put on its disposition. The power switch 24 may be disposed, for example, on the back of the camera body 200.

The dial 26 is a rotatable member and functions as means for switching the mode of the camera 10. The rotational control of the dial 26 allows the camera 10 to be set in an "imaging mode" which provides imaging of a subject to record an image of the subject or a "playback mode" which provides playing back recorded images.

Figure 2:
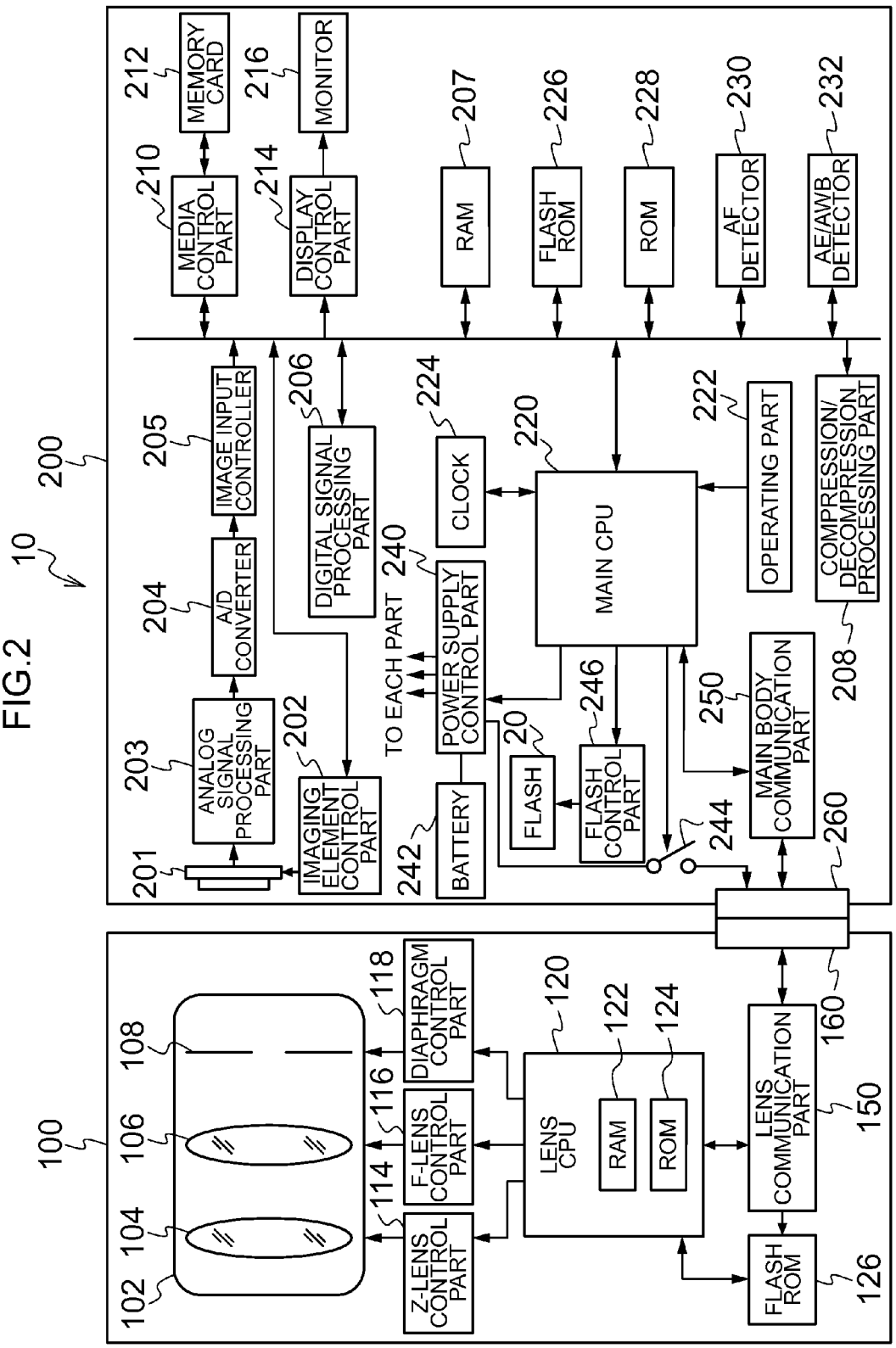
FIG. 2 is a block diagram illustrating an overall configuration of an interchangeable-lens camera of FIG. 1.

FIG. 2 is a block diagram illustrating an overall configuration of the camera 10.

The lens unit 100 includes a photographing optical system 102 (a zoom lens 104, a focus lens 106 and a diaphragm 108), a zoom lens control part 114, a focus lens control part 116, a diaphragm control part 118, a lens CPU (Central Processing Unit) 120, a flash ROM (Read-Only Memory) 126, a lens communication part 150 (a communication part on lens side), and the lens mount 160 (a mounting part on lens side).

The photographing optical system 102 includes the zoom lens 104, the focus lens 106 and the diaphragm 108. The zoom lens control part 114 controls the position of the zoom lens 104 according to a command given by the lens CPU 120. The focus lens control part 116 controls the position of the focus lens 106 according to a command given by the lens CPU 120. The diaphragm control part 118 controls the opening area of the diaphragm 108 according to a command given by the lens CPU 120.

The lens CPU 120 is a central processing unit (CPU) for the lens unit 100, and has a ROM 124 and a RAM (Random Access Memory) 122 built-in.

The flash ROM 126 is a type of volatile memory that stores programs and the like downloaded from the camera body 200.

In accordance with a control program stored in the ROM 124 or the flash ROM 126, the lens CPU 120 controls each part of the lens unit 100 using the RAM 122 as a working area.

With the lens mount 160 mounted on the body mount 260 of the camera body 200, the lens communication part 150 communicates with the camera body 200 via a plurality of signal terminals (signal terminals on lens side, described later) provided on the lens mount 160.

The camera body 200 includes an imaging element 201, an imaging element control part 202, an analog signal processing part 203, an A/D converter 204, an image input controller 205, a digital signal processing part 206, a RAM 207, a compression/decompression processing part 208, a media control part 210, a memory card 212, a display control part 214, a monitor 216, a main CPU 220 (a body control part), an operating part 222, a clock 224, a flash ROM 226, a ROM 228, an AF detector 230, an AE/AWB detector 232, a power supply control part 240, a battery 242 (a power supply), a flash control part 246, a main body communication part 250 (a communication part on body side), and the body mount 260 (a mounting part on body side).

The imaging element 201 includes an image sensor for imaging a subject. A subject optical image formed on the photosensitive surface of the imaging element 201 by means of the photographing optical system 102 of the lens unit 100 is converted to an electric signal by the imaging element 201. Examples of the imaging element 201 include MOS (Metal Oxide Semiconductor) image sensors and CCD (Charge Coupled Device) image sensors.

According to a command given by the main CPU 220, the imaging element control part 202 controls a timing, an exposure time and the like for the imaging element 201 to perform imaging.

The analog signal processing part 203 performs various kinds of analog signal processing on an analog image signal acquired by imaging a subject with the imaging element 201. The analog signal processing part 203 in this example includes a sample and hold circuit, a color separation circuit and a gain control circuit.

The A/D converter 204 converts an analog image signal outputted from the analog signal processing part 203 into a digital image signal.

The image input controller 205 temporarily stores a digital image signal outputted from the A/D converter 204 as image data in the RAM 207.

When the imaging element 201 is a MOS image sensor, the A/D converter 204 is often embedded in the imaging element 201.

The digital signal processing part 206 performs various kinds of digital signal processing on image data stored in the RAM 207. The digital signal processing part 206 in this example includes a luminance/color-difference signal generating circuit, a gamma correction circuit, a sharpness correction circuit, a contrast correction circuit, and a white balance correction circuit.

The compression/decompression processing part 208 performs compression processing on uncompressed image data stored in the RAM 207. The compression/decompression processing part 208 also performs decompression processing on compressed image data.

The media control part 210 has control over recording image data compressed by the compression/decompression processing part 208 on the memory card 212. The media control part 210 also has control over reading compressed image data from the memory card 212. It should be noted that the storage part for storing image data is not limited to a memory card.

The display control part 214 has control over displaying uncompressed image data stored in the RAM 207 on the monitor 216.

The monitor 216 is, for example, composed of a liquid crystal display device, an organic EL (electroluminescence) display device, or another display device.

To display a live view image (a through image) on the monitor 216, digital image signals successively generated in the digital signal processing part 206 are temporarily stored in the RAM 207. The display control part 214 converts the digital image signals temporarily stored in the RAM 207 to signals in a display format and outputs them in succession to the monitor 216. This causes an imaged image to be displayed on the monitor 216 in real time, allowing imaging with the monitor 216 used as an electronic viewfinder.

To image a subject and record a subject image, pressing the release button 22 halfway down causes the AE control and the AF control to be exercised under control from the main CPU 220. Then, pressing it all the way down executes imaging. The compression/decompression processing part 208 compresses an image taken by imaging in a specified compression format (e.g. JPEG (Joint Photographic Experts Group) format). The compressed image data is rendered into an image file added with required accompanying information such as a photographing date and photographing conditions and stored in the memory card 212 through the media control part 210.

The main CPU 220 integrally controls the overall operation of the camera 10. The main CPU 220 includes a mounting determination part that determines whether or not the lens unit 100 is mounted on the body mount 260. A process for determining the mounting of a lens performed by the main CPU 220 is described later in detail.

The operating part 222 includes the release button 22, the power switch 24 and the dial 26 illustrated in FIG. 1. The main CPU 220 controls each part of the camera 10 according to input from the operating part 222 and the like.

As a timer, the clock 224 measures time based on commands from the main CPU 220. The clock 224 generates the timing for detecting instructions inputted from an instruction input device. Examples of the instruction input device include the release button 22 and the dial 26. Despite not being illustrated, various instruction input devices are provided on the back of the camera body 200. A touch panel may be used as an instruction input device. The main CPU 220 in this example employs the clock 224 to detect voltage at the LENS_DET terminal (a lens detection terminal) of FIG. 3 described later at time intervals identical to the timing for the detection of an instruction input. The clock 224 also measures the present day and time as a calendar.

The flash ROM 226, a type of readable/writable volatile memory, stores setting information.

The ROM 228 stores a control program executed by the main CPU 220 and various kinds of data required for control. In accordance with the control program stored in the ROM 228, the main CPU 220 controls each part of the camera 10 using the RAM 207 as a working area.

The AF detector 230 calculates a value required for the autofocus (AF) control based on the digital image signal. In the case of so-called contrast AF, for example, the integrated value (focus evaluation value) of high-frequency components of a G signal in a prescribed AF area is calculated. The main CPU 220 moves the focus lens 106 to a position where the focus evaluation value represents the maximum. The AF control system is not limited to contrast AF. For example, phase difference AF may be used.

The AE/AWB detector 232 calculates a value required for the automatic exposure (AE) control and the automatic white balance (AWB) control based on the digital image signal. The main CPU 220 calculates the brightness of a subject (subject brightness) based on the value obtained by the AE/AWB detector 232 and determines an f-stop number and a shutter speed in relation to a predetermined program diagram.

In accordance with commands from the main CPU 220, the power supply control part 240 applies a power voltage supplied from the battery 242 to each part of the camera body 200. Also, in accordance with commands from the main CPU 220, the power supply control part 240 applies a power voltage supplied from the battery 242 to each part of the lens unit 100 via the body mount 260 and the lens mount 160.

Power voltage fed to the lens unit 100 via the body mount 260 and the lens mount 160 is switched in level and turned on and off by a lens power supply switch 244 in accordance with commands from the main CPU 220.

In accordance with commands from the main CPU 220, the flash control part 246 controls light emitted from a flash 20.

In accordance with commands from the main CPU 220, the main body communication part 250 sends and receives (communicates) signals to/from the lens communication part 150 of the lens unit 100 connected via the body mount 260 and the lens mount 160. Meanwhile, in accordance with commands from the lens CPU 120, the lens communication part 150 sends and receives (communicates) signals to/from the main body communication part 250 of the camera body 200 connected via the lens mount 160 and the body mount 260.

Example of Mounting Part

Figure 3:
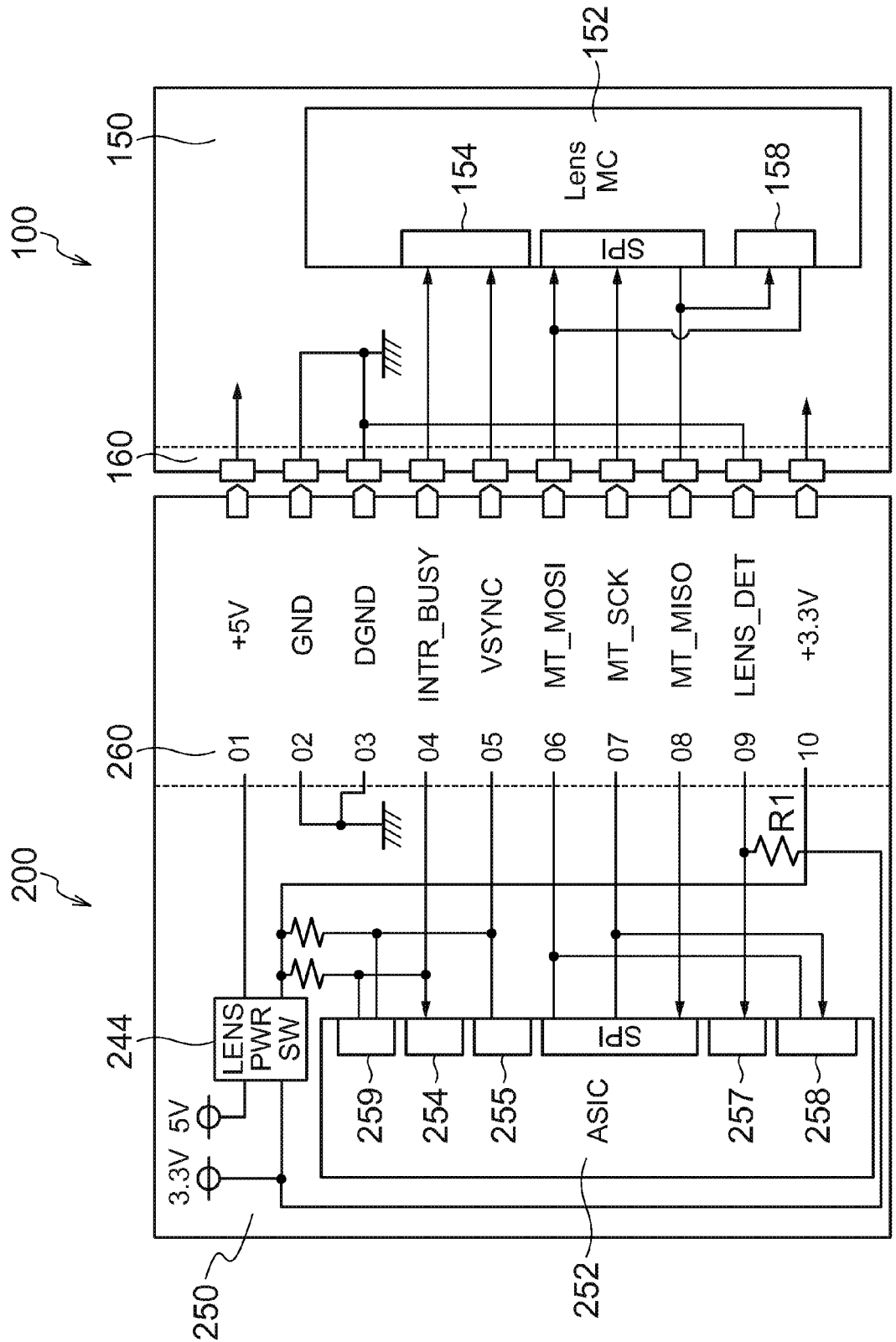
FIG. 3 illustrates a body mount (a mounting part on body side), a lens mount (a mounting part on lens side) and their peripheries.

FIG. 3 illustrates the body mount 260, the lens mount 160 and their peripheries. With the lens mount 160 mounted on the body mount 260, each of a plurality of terminals in the body mount 260 (in this example, ten terminals numbered "01" through "10" in FIG. 3) comes into contact with each of a plurality of terminals in the lens mount 160.

A first terminal (+5 V terminal) on the body mount 260 is a power supply terminal on body side to feed a voltage of +5 V of the battery 242 from the camera body 200 to the lens unit 100. The first terminal (+5 V terminal) on the body mount 260 is connected to the power supply control part 240 and the battery 242 via the lens power supply switch 244.

A second terminal (GND terminal) and a third terminal (DGND terminal) on the body mount 260 are ground terminals on body side to feed a voltage of 0 V (ground voltage) from the camera body 200 to the lens unit 100. The second terminal and the third terminal are connected to a ground in the camera body 200.

A fourth terminal to an eighth terminal on the body mount 260 are a plurality of signal terminals on body side for transmission and reception (communications) of signals to/from the lens unit 100.

The fourth terminal (INTR_BUSY signal terminal) on the body mount 260 is a body-side signal terminal for notifying a specific action term for the lens unit 100 from the lens unit 100 to the camera body 200. A specific action term for the camera body 200 may be notified from the camera body 200 to the lens unit 100 through the fourth terminal. In this example, High level (high potential) indicates not-in-action and Low level (low potential) indicates active (busy).

A fifth terminal (VSYNC signal terminal) on the body mount 260 is a body-side signal terminal for synchronization between the camera body 200 and the lens unit 100.

The sixth terminal (MT_MOSI signal terminal), the seventh terminal (MT_SCK signal terminal) and the eighth terminal (MT_MISO signal terminal) on the body mount 260 are body-side signal terminals for serial communications between the camera body 200 and the lens unit 100. The MT_MOSI signal is a signal that is outputted from the camera body 200 acting as a master and inputted to the lens unit 100 acting as a slave. The MT_SCK signal is a clock signal that the camera body 200 acting as a master sends to the lens unit 100 acting as a slave. The MT_MISO signal is a signal that is outputted from the lens unit 100 acting as a slave and inputted to the camera body 200 acting as a master.

A ninth terminal (LENS_DET terminal) on the body mount 260 is a body-side terminal dedicated to the detection of the lens unit 100. In this example, High level (high potential) indicates that the LENS_DET terminal of the body mount 260 is not in contact with the LENS_DET terminal of the lens mount 160 (not mounted). Low level (low potential) indicates that the LENS_DET terminal of the body mount 260 is in contact with the LENS_DET terminal of the lens mount 160 (mounted).

A tenth terminal (+3.3 V terminal) on the body mount 260 is a second power supply terminal on body side, which feeds a voltage of +3.3 V of the battery 242 from the camera body 200 to the lens unit 100.

The ninth terminal (LENS_DET terminal) on the body mount 260 is connected to the power supply control part 240 and the battery 242 via a pull-up resistor R1. In this example, the pull-up resistor R1 has a resistance value of 220 kΩ.

The ninth terminal (LENS_DET terminal) on the lens mount 160 is connected to a ground (GND terminal and DGND terminal).

The main CPU 220 functions as a mounting determination part to determine, based on voltage (High/Low level) at the ninth terminal (LENS_DET terminal) of the body mount 260, whether or not the lens mount 160 is mounted on the body mount 260 (that is, whether or not the lens unit 100 is mounted on the camera body 200). To be concrete, the main CPU 220 determines that the lens unit 100 is mounted on the body mount 260 when the level of voltage at the LENS_DET terminal of the camera body 200 is low.

The main CPU 220 determines that the lens unit 100 is removed from the body mount 260 when the level of voltage at the ninth terminal (LENS_DET terminal: a lens detection terminal) has changed from Low to High.

ASIC 252 (Application Specific Integrated Circuits) contained in the main body communication part 250 includes: a terminal 254 that detects and sets a change (High/Low) in potential at the fourth terminal (INTR_BUSY signal terminal) of the body mount 260; a terminal 255 for sending a synchronizing signal to the fifth terminal (VSYNC signal terminal) of the body mount 260; interface SPI (Serial Peripheral Interface) for serial communication by means of the 6th to 8th terminals (signal terminals for serial communications) on the body mount 260; a terminal 257 for detecting a change (High/Low) in potential at the ninth terminal (LENS_DET terminal) of the body mount 260; and interfaces 258 and 259 for updating the firmware of the lens unit 100.

Lens MC152 (an integrated circuit) contained in the lens communication part 150 includes: an interface 154 that detects and sets a change (High/Low) in potential at the fourth terminal (INTR_BUSY signal terminal) of the lens mount 160 to receive the synchronizing signal described above; interface SPI for serial communication by means of the 6th to 8th lens-side terminals (signal terminals for serial communications) on the lens mount 160; and an interface 158 for updating the firmware of the lens unit 100.

Example of Process for Determining the Mounting of Lens

Figure 4:
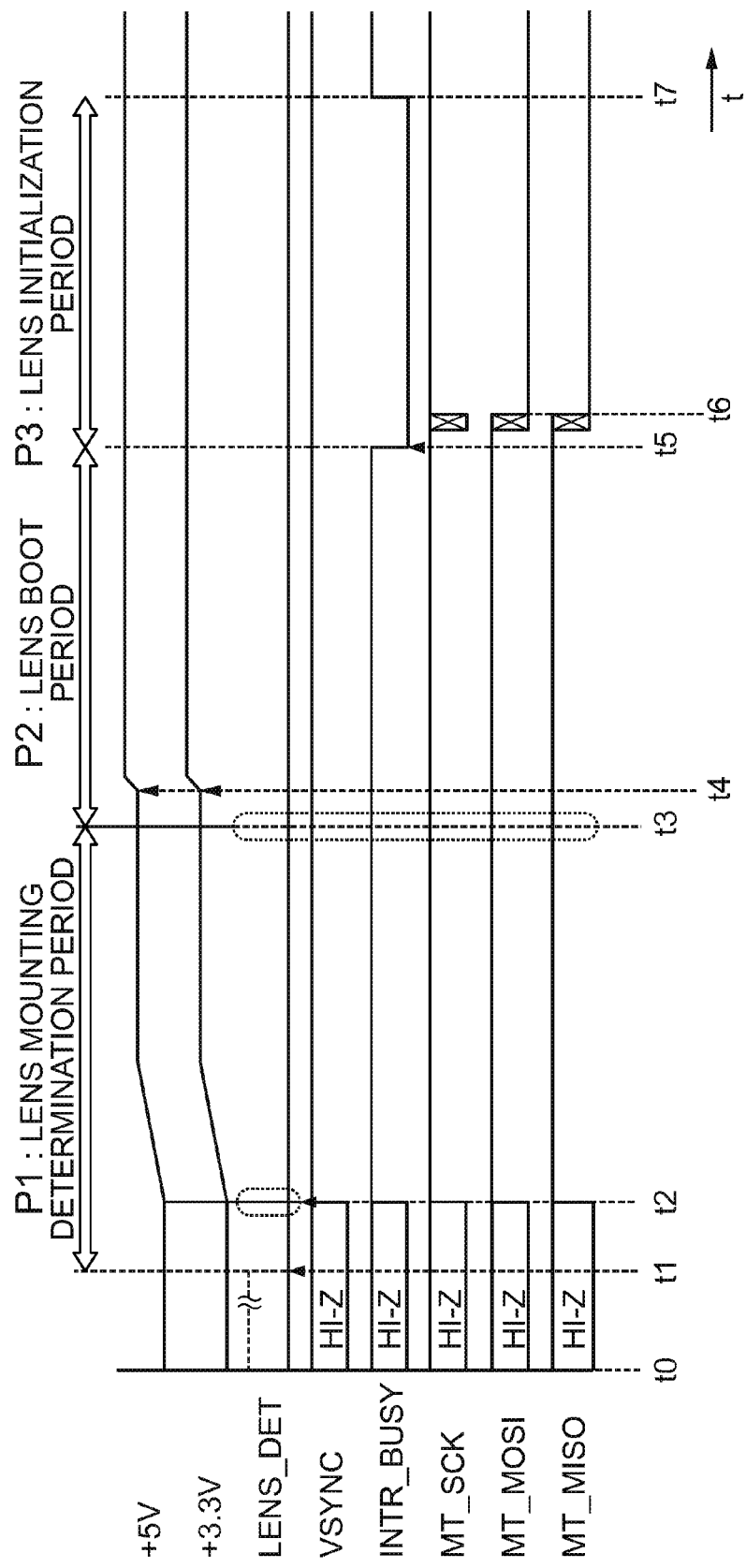
FIG. 4 is a timing chart illustrating an example of a change in voltage level at each terminal at the time of turning on a camera body.

FIG. 4 is a timing chart illustrating an example of a change in voltage level at each port of ASIC 252 corresponding to a voltage level at each terminal of the body mount 260 at power-on of the camera body 200. The main CPU 220 performs a process for determining the mounting of a lens during a lens mounting determination period P1 (t1 through t3) illustrated in FIG. 4. At t2 in P1, the main CPU 220 exercises control so as to preliminarily turn on the power (Soft Start) for supplying a weak current from the battery 242 to the lens unit 100 via the body-side power supply terminals (+5 V terminal, +3.3 V terminal). The weak current at preliminarily power-on is smaller than a current supplied to the lens unit 100 at regular power-on described later (e.g. a few tens of milliamperes). Preliminarily powering leads to the gradual accumulation of electric charge on a capacitor (not illustrated) provided on the lens unit 100 side.

When it has been determined that the lens unit 100 is mounted, preliminarily powering is switched to regular powering. To be more specific, the main CPU 220 exercises control so as to regularly turn on the power for supplying an amount of current (e.g. 1 A), which enables the lens unit 100 to run, from the battery 242 to the lens unit 100 via the body-side power supply terminals (+5 V terminal, +3.3 V terminal).

Although FIG. 4 illustrates voltages at the body-side power supply terminals (+5 V terminal, +3.3 V terminal) in two stages for convenience so as to make preliminary powering (start at t2) and regular powering (start at t4) easier to understand in visual form, target voltages reached by preliminary powering through weak current are in reality the same as voltages (+5 V, 3.3 V) by regular powering.

Progression to a lens boot period P2 (t3 through t5) is made and when the system of the lens unit 100 has booted, a lens initialization period P3 (t5 through t7) starts. At the lens initialization period P3 (t5 through t7), the main CPU 220 communicates with the lens unit 100 via the signal terminals (MT_SCK signal terminal, MT_MOSI signal terminal, MT_MISO signal terminal, INTR_BUSY signal terminal, VSYNC signal terminal) while supplying regular power voltages (+5 V, +3.3 V) to the lens unit 100 via the body-side power supply terminals (+5 V terminal, +3.3 V terminal).

Figure 5:
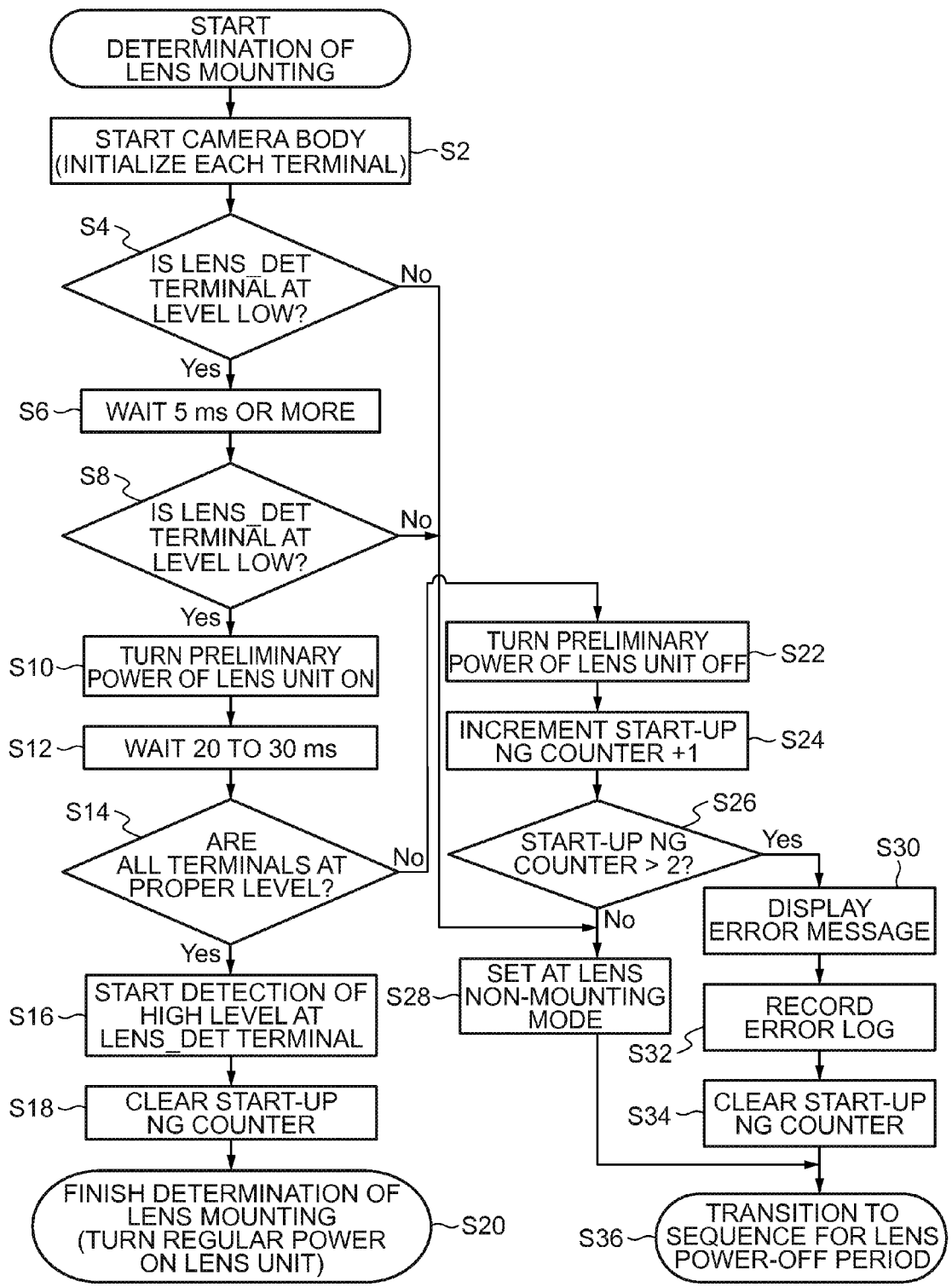
FIG. 5 is a flowchart illustrating an example of a process for determining the mounting of a lens at the time of turning on a camera body.

FIG. 5 is a flowchart illustrating an example of a process for determining the mounting of a lens at power-on of the camera body 200. The main CPU 220 of the camera body 200 executes the process for determining the mounting of a lens according to a program. With reference to FIG. 5, an example of the process for determining the mounting of a lens at power-on of the camera body 200 will now be described.

When the camera body 200 is turned on with the power switch 24 (t0 of FIG. 4), the main CPU 220 executes the process of starting the camera body 200 (step S2). At the step S2, the main CPU 220 initializes each terminal on the body mount 260. The main CPU 220 in this example turns off the lens power supply switch 244 (turn off preliminary power as well as regular power) and at the same time, sets each port of ASIC 252 corresponding to each of INTR_BUSY signal terminal, VSYNC signal terminal, MT_SCK signal terminal, MT_MOSI signal terminal and MT_MISO signal terminal on the body mount 260 to high impedance (Hi-Z).

When the lens mount 160 is not mounted on the body mount 260, the pull-up resistor R1 in the camera body 200 causes voltage at the LENS_DET terminal of the body mount 260 to be set to the level High. When the lens mount 160 is mounted on the body mount 260, voltage at the LENS_DET terminal of the body mount 260 is brought into conduction with the ground (GND) via the terminal of the lens unit 100 and set to the level Low.

At t1 in FIG. 4, the main CPU 220 determines whether or not the LENS_DET terminal on the body mount 260 is at the level Low (step S4). When the LENS_DET terminal is at the level Low, the main CPU 220 uses the clock 224 to enter a 5 ms or more wait as a chattering setting wait (step S6) and again determines whether or not the LENS_DET terminal on the body mount 260 is at the level Low (step S8).

If Yes at the step S4 and the step S8 (in other words, the LENS_DET terminal has been at the level Low for 5 ms or more), the main CPU 220 causes the lens power supply switch 244 to preliminarily turn the power on at t2 in FIG. 4 (step S10). Also, each port of ASIC 252 corresponding to each of INTR_BUSY signal terminal, VSYNC signal terminal, MT_MOSI signal terminal, MT_SCK signal terminal and MT_MISO signal terminal on the body mount 260 changes to the level High.

After preliminarily powering, the main CPU 220 uses the clock 224 to enter a 20 to 30 ms wait so that the voltage levels of the signal terminals are assessed (step S12).

At t3 in FIG. 4, the main CPU 220 determines whether or not the LENS_DET terminal on the body mount 260 is at the level Low and the signal terminals are at the level High (step S14). The main CPU 220 in this example verifies whether or not the INTR_BUSY signal terminal, the VSYNC signal terminal, the MT_SCK signal terminal, the MT_MOSI signal terminal and the MT_MISO signal terminal are at the level High concurrently with the determination of the LENS_DET terminal level.

When the LENS_DET terminal is at the level Low and the signal terminals (the INTR_BUSY signal terminal, the VSYNC signal terminal, the MT_SCK signal terminal, the MT_MOSI signal terminal and the MT_MISO signal terminal) are at the level High, the process goes to step S16. If the LENS_DET terminal is at the level High or the signal terminals are at the level Low, the process determines that the lens unit 100 is not mounted, and goes to step S22.

When the mount of a lens is determined at the step S14, the main CPU 220 starts the detection of a High level edge (an edge at which the level Low is switched to the level High) at the LENS_DET terminal (step S16). The main CPU 220 in this example enables ASIC 252 to make an interrupt so as to detect a High level edge at the LENS_DET terminal.

Next, the main CPU 220 clears a start-up NG counter (step S18). This completes the process for determining the mounting of a lens.

After the completion of the process for determining the mounting of a lens, the main CPU 220 starts lens boot processing and causes the lens power supply switch 244 to regularly turn on the power of the lens unit 100 (step S20, t4 in FIG. 4). Regularly powering secures all kinds of signal processing by the lens unit 100 and an amount of current which permits lens operation.

In addition, the main CPU 220 makes a setting for communication at each signal terminal. Specifically, it enables an interrupt for detecting a Low level edge (an edge at which the level High is switched to the level Low) in the INTR_BUSY signal, makes a setting for the output of the VSYNC signal and initializes the interface SPI for serial communication in ASIC 252.

When the lens CPU 120 starts initial position driving for moving every kind of lens in the lens unit 100 to each initial setting position, the lens communication part 150 switches the level of the INTR_BUSY signal from High to Low.

Although FIG. 5 illustrates a step at the step S14, in which the level Low for the LENS_DET terminal and the level High for the signal terminals are checked, a step of the present invention is not limited to the step like this. The main CPU 220 determines that the lens unit 100 is mounted on the body mount 260 when the level Low has been detected a plurality of consecutive times at the LENS_DET terminal (steps S4 and S8). Thus, the step S14 may be omitted.

Processing when the non-mounting of the lens unit 100 is detected at power-on of the camera body 200 will now be described.

The main CPU 220 assesses that the lens unit 100 is not mounted on the body mount 260 when it is determined that the LENS_DET terminal is at the level High (high potential) in the step S4 or S8. Then, the main CPU 220 changes the operation mode to a lens non-mounting mode (step S28) and makes a transition to a sequence for a lens power-off period (step S36).

Upon determining the non-mounting of the lens unit 100 in the step S14, the main CPU 220 turns off the lens power supply switch 244 so as to turn off the preliminary power of the lens unit 100 (step S22).

Next, the main CPU 220 increments the start-up NG counter by one (step S24), and determines whether or not the start-up NG counter exceeds a threshold ("2" in this example) (step S26).

If the start-up NG counter is smaller than or equal to the threshold, the main CPU 220 changes the operation mode to the lens non-mounting mode (step S28) and makes a transition to the sequence for a lens power-off period (step S36).

If the start-up NG counter exceeds the threshold, the main CPU 220 outputs an error message to the monitor 216 through the display control part 214 (step S30), records an error log on the flash ROM 226 (step S32), clears the start-up NG counter (step S34), and makes a transition to the sequence for a lens power-off period (step S36).

Examples of the error message for display include "Check lens". The error message may be output by voice. Examples of a record of the error log include "Lens boot start-up timeout error".

Processing performed by the main CPU 220 during the lens initialization period P3 of FIG. 4 will now be described.

The main CPU 220 uses the timer of the clock 224 to monitor the presence or absence of an interrupt for a Low level edge in the INTR_BUSY signal. If the level of the INTR_BUSY signal does not switch from High to Low after a lapse of a certain period of time (e.g. 200 ms) from the turning-on of the regular power due to a failure of the lens unit 100 or the like, the main body communication part 250 turns off the lens power supply switch 244 to stop the supply of the power to the +5 V and 3.3 V power supply terminals on the body mount 260 and records an error log as a lens system boot time-out error on the flash ROM 226.

Upon detecting a Low edge (a change from the level High to the level Low) in the INTR_BUSY signal through an interrupt within a certain period of time from the turning-on of the regular power, the main body communication part 250 sends a NOP command to the lens communication part 150 by means of MT_MOSI signals for serial communication. The lens communication part 150, which has received the NOP command, sends a NOP acknowledgment to the main body communication part 250 by means of MT_MISO signals for serial communication. If the NOP acknowledgment is "OK", the main body communication part 250 further performs serial communications with the lens communication part 150 to acquire a lens ID and a serial number. If the NOP acknowledgment is "NG", the main body communication part 250 assesses it as a communication error, thus performs communication error recovery processing.

Figure 6:
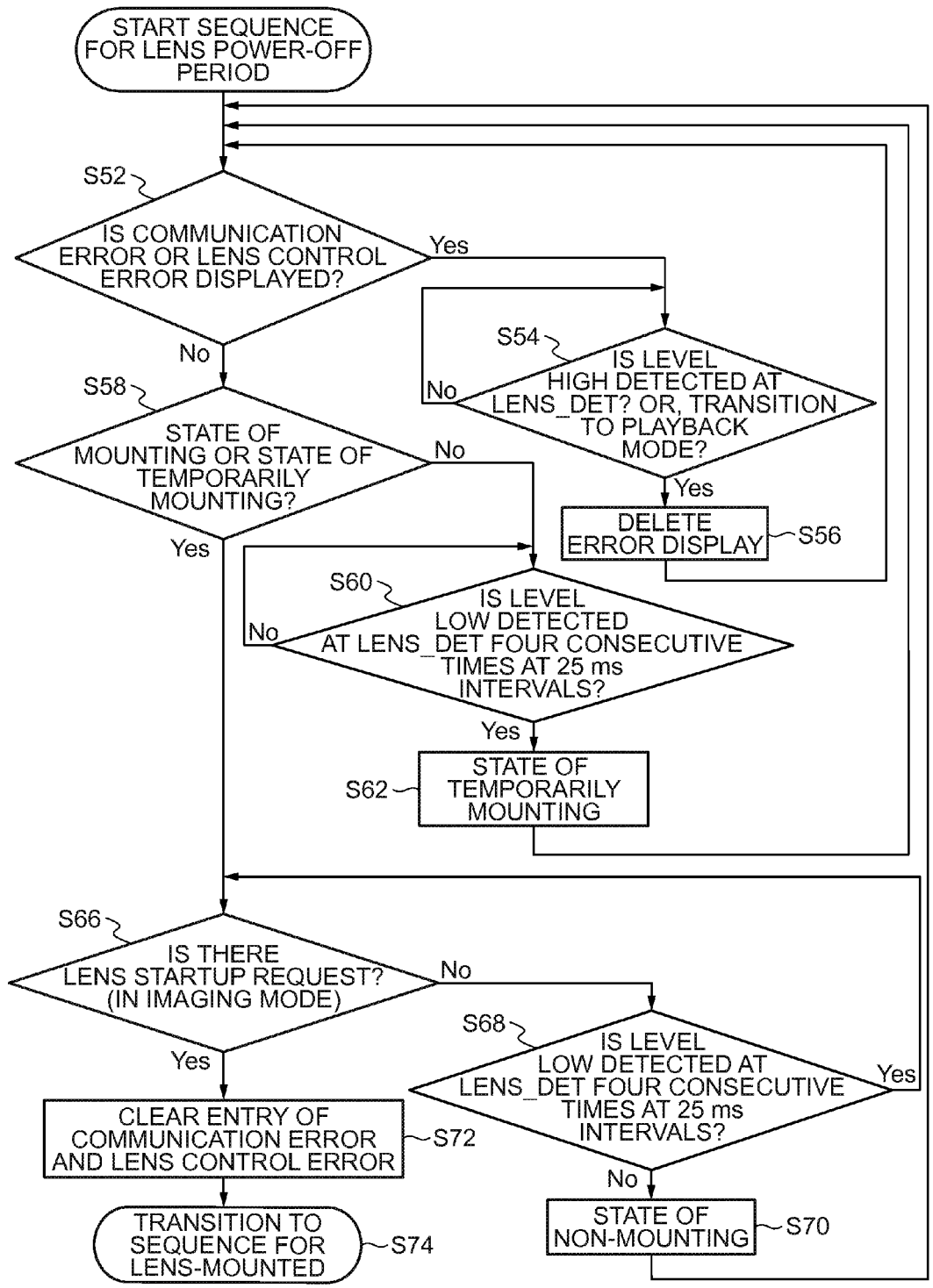
FIG. 6 is a flowchart illustrating an example of a process for determining the mounting of a lens after start-up of a camera body.

FIG. 6 is a flowchart illustrating an example of a process for determining the mounting of a lens while the camera body 200 is in powered-on condition (in hot line condition). The main CPU 220 of the camera body 200 executes the process for determining the mounting of a lens as step S36 of FIG. 5 according to a program. With reference to FIG. 6, an example of the process for determining the mounting of a lens while the camera body 200 is in powered-on condition (in hot line condition) will now be described.

When the sequence for a lens power-off period (in other words, a period while no power is supplied to the lens unit 100) starts, the main CPU 220 first determines whether or not a communication error or a lens control error is displayed (step S52). If Yes in the step S52, and either when the level High (non-mounting) is detected at the LENS_DET terminal or in the case of a transition to the playback mode (Yes in the step S54), the main CPU 220 deletes the error display (step S56) and makes a return to the step S52.

If No in the step S52 (no error is displayed), the main CPU 220 determines whether or not the state of mounting (the lens unit 100 is mounted and power is supplied to the lens unit 100) or the state of temporarily mounting (the lens unit 100 is mounted while no power is supplied to the lens unit 100) is true (step S58).

If both the state of mounting and the state of temporarily mounting are false (that is, non-mounting), the main CPU 220 determines whether or not voltage level is detected at the LENS_DET terminal four consecutive times at 25 ms intervals (step S60).

If Yes in the step S60 (determined that the lens unit 100 is mounted) (Yes in the step S60), the main CPU 220 assesses it as the state of temporarily mounting (step S62) and makes a return to the step S52.

If the state of mounting or the state of temporarily mounting is true (Yes in the step S58), the main CPU 220 determines whether or not a lens startup request exists (in the imaging mode) (step S66).

If no lens startup request exists (No in the step S66), the main CPU 220 determines whether or not voltage level is detected at the LENS_DET terminal four consecutive times at 25 ms intervals (step S68).

If No in the step S68 (in other words, determined that the lens unit 100 has been removed), the main CPU 220 assesses it as the state of non-mounting (step S70) and makes a return to the step S52.

If a lens startup request exists (Yes in the step S66), the main CPU 220 clears an entry of the communication error and the lens control error (step S72) and makes a transition to a sequence for lens-mounted (sequence for lens powered-on) (step S74).

An embodiment that exemplifies an interchangeable-lens camera without a reflecting mirror (mirrorless interchangeable-lens camera) has been described. It should be noted that the present invention is also applicable to an interchangeable-lens camera equipped with a reflecting mirror. Although an example in which the camera body includes an imaging element has been described, the present invention is also applicable to an example in which the lens unit includes an imaging element.

In the embodiment, the main CPU 220 functions as a mounting determination part and determines that the lens unit 100 is mounted on the body mount 260 when the level of voltage at the lens detection terminal (LENS_DET terminal) on the body mount 260 (a mounting part) has been detected to be low a plurality of consecutive times. The main CPU 220 performs a mounting determination by detecting voltage at the lens detection terminal (LENS_DET terminal) n1 consecutive times and at time intervals of d1 at the time of turning-on the power supply (battery 242) with the power switch 24. Then, when a result of the mounting determination turns out to be non-mounting, the main CPU 220 determines the mounting of the lens unit 100 by detecting voltage at the lens detection terminal (LENS_DET terminal) n2 consecutive times and at time intervals of d2 (where n2 and d2 are equal to or greater than n1 and d1, respectively) on condition that at least one of d1<d2 and n1<n2 are met. In other words, the main CPU 220, upon the power being turned on with the power switch 24, determines that the lens unit 100 is mounted on the body mount 260 if the level of voltage at the lens detection terminal (LENS_DET terminal) on the body mount 260 has been detected to be low at predetermined time intervals and n consecutive times (n: an integer of 2 or greater). If the level of voltage at the lens detection terminal (LENS_DET terminal) has been detected to be high at least once, the main CPU 220 makes at least one of the time intervals and the times n larger and determines whether or not the lens unit 100 is mounted on the body mount 260.

Application of the present invention is not limited to the examples described and the examples illustrated in the drawings in this specification, and it should be understood that various design modifications and alterations may occur insofar as they are within the scope of the present invention.

What is claimed is:
1. A camera body comprising:
a mounting part to which a lens unit is removably attached, the mounting part comprising a lens detection terminal to which a pull-up resistor is connected, the lens detection terminal being pulled down while the lens unit is mounted;

a power supply;

a power switch configured to turn on the power supply; and a mounting determination part configured to determine that the lens unit is mounted on the mounting part if a level of voltage at the lens detection terminal on the mounting part has been detected to be low a plurality of consecutive times, wherein the mounting determination part performs a mounting determination by detecting voltage, at the lens detection terminal, n1 consecutive times at time intervals of d1 at a time of turning-on the power supply with the power switch, and wherein, after a result of the mounting determination turns out to be non-mounting, the mounting determination part determines mounting by detecting voltage, at the lens detection terminal, n2 consecutive times at time intervals of d2 (where n2 is equal to or greater than n1, and d2 is equal to or greater than d1) on condition that any one of conditional expressions d1<d2 and n1<n2 is met.

2. The camera body according to claim 1, wherein the mounting determination part detects voltage at the lens detection terminal, on condition that the time intervals of voltage detection meet the conditional expression d1<d2 and the consecutive times of voltage detection meet the conditional expression n1<n2.

3. The camera body according to claim 1, wherein the mounting determination part determines that the lens unit has been removed from the mounting part when the level of voltage at the lens detection terminal has changed from low to high.

4. The camera body according to claim 1, further comprising:

an instruction input device configured to input instructions; and a timer configured to generate a timing for detecting instructions inputted from the instruction input device, wherein the mounting determination part uses the timer to detect voltage at the lens detection terminal at time intervals identical to the time intervals for detecting inputted instructions.

5. An interchangeable-lens camera comprising:

the camera body according to claim 1; and the lens unit.

6. A method of determining mounting of a lens on a camera body, the camera body comprising:

a mounting part to which a lens unit is removably attached, the mounting part comprising a lens detection terminal to which a pull-up resistor is connected, the lens detection terminal being pulled down while the lens unit is mounted;

a power supply; and a power switch configured to turn on the power supply, wherein the method provides a determination that the lens unit is mounted on the mounting part if a level of voltage at the lens detection terminal on the mounting part has been detected to be low a plurality of consecutive times, wherein the determination is made by detecting voltage, at the lens detection terminal, n1 consecutive times at time intervals of d1 at the time of turning-on the power supply with the power switch, and wherein, after a result of the determination turns out to be non-mounting, a determination is made by detecting voltage, at the lens detection terminal, n2 consecutive times at time intervals of d2 (where n2 is equal to or greater than n1, and d2 is equal to or greater than d1) on condition that any one of conditional expressions d1<d2 and n1<n2 is met.

* * * * *